United States Patent
Kojima et al.

(10) Patent No.: US 11,145,847 B2
(45) Date of Patent: Oct. 12, 2021

(54) LEAD-ACID BATTERY

(71) Applicant: GS Yuasa International Ltd., Kyoto (JP)

(72) Inventors: Yu Kojima, Shizuoka (JP); Mikihito Hasegawa, Shizuoka (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 16/080,193

(22) PCT Filed: Feb. 24, 2017

(86) PCT No.: PCT/JP2017/007249
§ 371 (c)(1),
(2) Date: Aug. 27, 2018

(87) PCT Pub. No.: WO2017/159299
PCT Pub. Date: Sep. 21, 2017

(65) Prior Publication Data
US 2019/0058180 A1 Feb. 21, 2019

(30) Foreign Application Priority Data
Mar. 15, 2016 (JP) .............................. JP2016-050787

(51) Int. Cl.
*H01M 2/24* (2006.01)
*H01M 2/04* (2006.01)
(Continued)

(52) U.S. Cl.
CPC .............. *H01M 2/24* (2013.01); *H01M 2/02* (2013.01); *H01M 2/0237* (2013.01); *H01M 2/04* (2013.01);
(Continued)

(58) Field of Classification Search
CPC ........ H01M 2/24; H01M 2/02; H01M 2/0237; H01M 2/28; H01M 2/26; H01M 4/73; H01M 10/06; H01M 10/12
See application file for complete search history.

(56) References Cited

U.S. PATENT DOCUMENTS

| 4,724,190 A | 2/1988 | Siga |
| 5,308,719 A * | 5/1994 | Mrotek .................... H01M 2/24 429/160 |
| 2014/0329137 A1* | 11/2014 | Martinez ................. H01M 4/20 429/163 |

FOREIGN PATENT DOCUMENTS

| JP | S62022367 A | 1/1987 |
| JP | H09199102 A | 7/1997 |

(Continued)

OTHER PUBLICATIONS

WO-2012127789-A1 translation (Year: 2019).*
International Search Report dated Apr. 11, 2017 filed in PCT/JP2017/007249.

*Primary Examiner* — Ula C Ruddock
*Assistant Examiner* — Armindo Carvalho, Jr.
(74) *Attorney, Agent, or Firm* — Rankin, Hill & Clark LLP

(57) ABSTRACT

Provided is a lead-acid battery where a positive electrode shelf and a negative electrode shelf are electrically connected to each other through a penetrating connection body including a welded portion filled in a penetration hole in a partition wall. A distance A between upper end surfaces of the positive and negative electrode shelves and a lower end portion of the penetration hole is 3-5 mm, a distance B between an upper end portion of the penetration hole and an upper end portion of the penetrating connection body is 3-5 mm, a distance C between the upper end portion of the penetrating connection body and a level of the electrolyte (Continued)

solution is 0 mm or more, and a height of the positive and negative electrode grid portions is 100 mm or more.

2 Claims, 3 Drawing Sheets

(51) Int. Cl.
*H01M 2/28* (2006.01)
*H01M 4/73* (2006.01)
*H01M 10/06* (2006.01)
*H01M 2/02* (2006.01)
*H01M 10/12* (2006.01)

(52) U.S. Cl.
CPC ............... *H01M 2/28* (2013.01); *H01M 4/73* (2013.01); *H01M 10/06* (2013.01); *H01M 10/12* (2013.01); *H01M 2220/20* (2013.01); *Y02E 60/126* (2013.01)

(56) References Cited

FOREIGN PATENT DOCUMENTS

| | | | |
|---|---|---|---|
| JP | 2008204772 A | 9/2008 | |
| WO | 2012127789 A1 | 9/2012 | |
| WO | WO-2012127789 A1 * | 9/2012 | .......... H01M 2/0262 |

* cited by examiner

LEAD-ACID BATTERY

TECHNICAL FIELD

The present invention relates to a lead-acid battery, and more particularly to a lead-acid battery including large-sized positive electrode and negative electrode where a grid portion has a height of 100 mm or more.

BACKGROUND ART

A lead-acid battery is inexpensive, has a relatively high battery voltage, and acquires large electric power. Accordingly, the lead-acid battery has been used in various applications besides a cell starter of a vehicle such as an automobile. The lead-acid battery includes: a plurality of positive electrodes containing lead dioxide as a positive active material; a plurality of negative electrodes containing lead as a negative active material; and a separator interposed between the positive electrode and the negative electrode disposed adjacently to each other. The plurality of positive electrodes and the plurality of negative electrodes are respectively connected to a positive electrode shelf and a negative electrode shelf parallel to each other by way of lug portions integrally formed with grid-like current collectors (grid portions) each carrying active material.

An element is accommodated in each of a plurality of cell chambers formed in a container by partitioning using partition walls. Two elements accommodated in the cell chambers disposed adjacently to each other are connected in series by a penetrating connection body. The penetrating connection body is formed of a positive electrode side member continuously formed with the positive electrode shelf and a negative electrode side member continuously formed with a negative electrode shelf. The penetrating connection body is formed by connecting the positive electrode side member and the negative electrode side member by resistance welding by way of a penetration hole formed in the partition wall which is used for forming the cell chambers by partitioning.

The lead-acid battery contains a large amount of free electrolyte solution. The container is formed using a material which allows the observation of the inside of the container in a see-through manner and hence, a user can understand the position of a level of an electrolyte solution with his eyes. Marks indicating an upper limit level and a lower limit level of an electrolyte solution are formed on the container. When the electrolyte solution goes beyond an upper limit, it is difficult to suppress a phenomenon that the electrolyte solution overflows from an electrolyte solution filling plug mounted on each cell chamber, and when the electrolyte solution goes beyond a lower limit, the degradation of the element is accelerated. Accordingly, the user is required to control an amount of the electrolyte solution such that the level of the electrolyte solution does not go beyond the lower limit level.

Recently, as a degradation mode of a lead-acid battery, there has been observed a phenomenon where a penetrating connection body is broken due to expansion of a positive electrode. The following is considered as the reason of the occurrence of such a phenomenon. The expansion of the positive electrode occurs due to elongation of a positive electrode grid portion by corrosion. When the positive electrode expands, a force which causes a change in height of a positive electrode shelf is generated so that a stress is applied to the penetrating connection body. Accordingly, a partition wall is deformed so that a gap is formed between the partition wall and the penetrating connection body whereby the degradation of the penetrating connection body is accelerated. In view of the above, patent document 1 proposes a technique of decreasing the degradation of a penetrating connection body by imparting rigidity to a partition wall by increasing a thickness of the partition wall.

PRIOR ART DOCUMENT

Patent Document

Patent Document 1: WO 2012/127789

SUMMARY OF THE INVENTION

Problems to be Solved by the Invention

However, when the thickness of the partition wall is increased, a depth of a penetration hole is increased and hence, in forming a penetrating connection body by resistance welding using a positive electrode side member and a negative electrode side member, amounts of deformation of the respective members are increased. Accordingly, it is difficult to ensure size accuracy with respect to these members and hence, failures are liable to occur in the manufacture of these members. Further, when the thickness of the partition wall is increased, a thickness of a welded portion is also increased and hence, resistance of the penetrating connection body is increased thus causing lowering of a power generating performance.

On the other hand, from a viewpoint of increasing a capacity of a lead-acid battery, there has been a demand for the increase of heights of grid portions of a positive electrode and a negative electrode. In this case, when the heights of the grid portions of the positive electrode and the negative electrode become 100 mm or more, there has been observed a phenomenon where a penetrating connection body is suddenly degraded so that short circuiting occurs between cell chambers due to an electrolyte solution whereby there is a possibility that the lead-acid battery loses its function as a battery. The following is considered as the reason of the occurrence of such a sudden degradation phenomenon. Along with the increase of a height of a grid portion, the elongation of the positive electrode due to expansion is also increased and hence, a stress applied to the penetrating connection body exceeds a threshold value. Among degradation modes of a lead-acid battery, no sign is recognized with respect to the above-mentioned sudden degradation phenomenon and hence, it is impossible for the user to predict such a degradation phenomenon whereby the user has no chance of exchanging the lead-acid battery.

Means for Solving the Problems

With respect to a sudden degradation phenomenon of a penetrating connection body, it is considered that the corrosion of a negative electrode side member of the penetrating connection body largely contributes to the degradation phenomenon besides a magnitude of the elongation of a positive electrode. This is because expansion caused by corrosion is observed on the negative electrode side member of the penetrating connection body of the lead-acid battery where such a sudden degradation phenomenon is observed in a region of a partition wall which covers a periphery of a penetration hole.

In view of the above-mentioned circumstances, according to an aspect of the present invention, there is provided a lead-acid battery which includes: a container; a partition wall which forms a plurality of cell chambers by partitioning the container; a plurality of elements each of which is accommodated in each of the plurality of cell chambers; an electrolyte solution accommodated in the plurality of cell chambers respectively; and a lid which closes opening portions of the plurality of cell chambers, wherein the element includes a plurality of positive electrodes, a positive electrode shelf which connects the plurality of positive electrodes parallel to each other, a plurality of negative electrodes, a negative electrode shelf which connects the plurality of negative electrodes parallel to each other, and a separator which is interposed between the positive electrode and the negative electrode disposed adjacently to each other, the plurality of positive electrodes include a positive active material, a positive electrode grid portion which carries the positive active material, and a positive electrode lug portion which is integrally formed with the positive electrode grid portion for connecting the positive electrode to the positive electrode shelf, the plurality of negative electrodes include a negative active material, a negative electrode grid portion which carries the negative active material, and a negative electrode lug portion which is integrally formed with the negative electrode grid portion for connecting the negative electrode to the negative electrode shelf, the positive electrode shelf which is a positive electrode shelf of one of two said elements accommodated in the respective cell chambers disposed adjacently to each other and the negative electrode shelf which is a negative electrode shelf of the other element are electrically connected to each other through a penetrating connection body penetrating the partition wall, the penetrating connection body includes a positive electrode side member continuously formed with the positive electrode shelf and a negative electrode side member continuously formed with the negative electrode shelf, and the positive electrode side member and the negative electrode side member form a welded portion filled in a penetration hole formed in the partition wall and are brought into close contact with a periphery of the penetration hole, a distance A between upper end surfaces of the positive electrode shelf and the negative electrode shelf and a lower end portion of the penetration hole is set to 3 mm to 5 mm, a distance B between an upper end portion of the penetration hole and an upper end portion of the penetrating connection body is set to 3 mm to 5 mm, a distance C between the upper end portion of the penetrating connection body and a level of the electrolyte solution is set to 0 mm or more, and a height of the positive electrode grid portion and the negative electrode grid portion is set to 100 mm or more.

Advantages of the Invention

According to the present invention, by controlling a size and an arrangement of the penetrating connection body formed in the partition wall and a distance between a level of an electrolyte solution and the penetrating connection body, corrosion of the negative electrode side member of the penetrating connection body can be suppressed. Accordingly, even when a height of the grid portions of the positive electrode and the negative electrode becomes equal to or larger than 100 mm, a sudden degradation phenomenon of the penetrating connection body minimally occurs.

MODE FOR CARRYING OUT THE INVENTION

Figure 1:
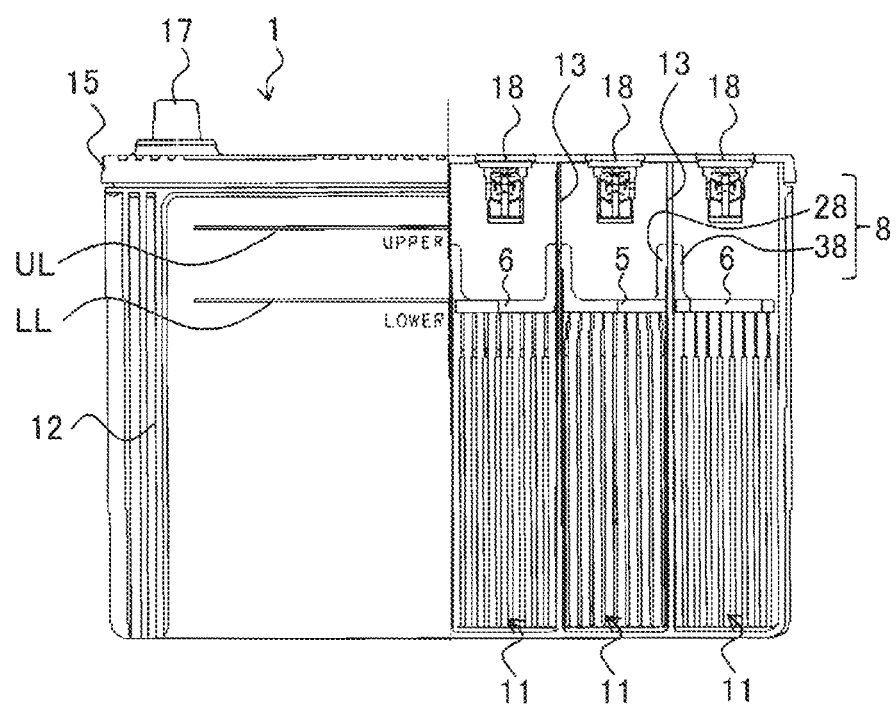
FIG. 1 is a front view of a lead-acid battery according to an embodiment of the present invention with a part cut away.

Although novel features of the present invention will be described in attached Claims, the present invention will be understood more deeply by the following detailed description which relates to both the configuration and the content of the present invention and is made with reference to drawings along with other objects and technical features of the present invention.

The lead-acid battery according to the present invention includes: a container; a partition wall which forms a plurality of cell chambers by partitioning the container; a plurality of elements each of which is accommodated in each of the plurality of cell chambers; an electrolyte solution accommodated in the plurality of cell chambers respectively; and a lid which closes opening portions of the plurality of cell chambers.

The container is usually formed using a material which allows the observation of the inside of the container in a see-through manner such that a user can understand the position of a level of an electrolyte solution with his eyes. Further, marks which indicate an upper limit level and a lower limit level of the electrolyte solution are usually formed on the container. With such a configuration, a user can easily control an amount of the electrolyte solution. An electrolyte solution filling plug (or a vent plug) for replenishing water into each cell chamber is usually formed on the lid. It is desirable to increase a distance between the upper limit level and the lower limit level as much as possible within a range that an overflow phenomenon of the electrolyte solution filling plug can be suppressed from a viewpoint of enhancing maintenance property by reducing frequency of replenishing water.

It is preferable that a thickness of the partition wall around the penetration hole be set to less than 1.7 mm, and more preferably to less than 1.5 mm. With such a configuration, the penetration hole does not become excessively deep and hence, deformation amounts of the respective members can be reduced in forming the penetrating connection body by welding the positive electrode side member and the negative electrode side member by resistance welding. Accordingly, it is possible to easily ensure size accuracy of these members so that the occurrence of failures in the manufacture of these members can be reduced. Further, a thickness of a welded portion can be reduced as much as possible and hence, resistance of the penetrating connection body can be reduced.

The element includes a plurality of positive electrodes, a positive electrode shelf which connects the plurality of positive electrodes parallel to each other, a plurality of negative electrodes, a negative electrode shelf which connects the plurality of negative electrodes parallel to each other, and a separator which is interposed between the positive electrode and the negative electrode disposed adjacently to each other. The plurality of positive electrodes respectively include a positive active material, a positive electrode grid portion which carries the positive active material, and a positive electrode lug portion which is integrally formed with the positive electrode grid portion for connecting the positive electrode to the positive electrode shelf, and the plurality of negative electrodes respectively include a negative active material, a negative electrode grid portion which carries the negative active material, and a negative electrode lug portion which is integrally formed with the negative electrode grid portion for connecting the negative electrode to the negative electrode shelf.

Both the connection between the positive electrode shelf and the positive electrode lug portions and the connection between the negative electrode shelf and the negative electrode lug portions can be performed by welding. The lower limit level of the electrolyte solution is set to be positioned between upper ends and lower ends of the positive electrode shelf and the negative electrode shelf so as to prevent at least the positive electrode lug portions and the negative electrode lug portions from being exposed from the electrolyte solution. Accordingly, corrosion of the lug portion can be suppressed thus reducing possibility of breaking of the lug portion.

The positive electrode shelf which is a positive electrode shelf of one of two said elements accommodated in the respective cell chambers disposed adjacently to each other and the negative electrode shelf which is a negative electrode shelf of the other element are electrically connected to each other through the penetrating connection body penetrating the partition wall. The penetrating connection body is formed of a positive electrode side member continuously formed with the positive electrode shelf and a negative electrode side member continuously formed with the negative electrode shelf. The positive electrode side member and the negative electrode side member are connected to each other by resistance welding through the penetration hole formed in the partition wall thus forming a welded portion filled in the penetration hole. Further, the positive electrode side member and the negative electrode side member are brought into close contact with a periphery of the penetration hole. With such a configuration, it is possible to prevent short circuiting between the cell chambers due to the electrolyte solution.

A sudden degradation phenomenon of the penetrating connection body is a phenomenon peculiar to a case where a relatively large element having a positive electrode grid portion and a negative electrode grid portion with a height of 100 mm or more are used. To allow a lead-acid battery to ensure favorable electric characteristics, it is necessary to increase a filling amount of an active material by increasing a height of grid portions of a positive electrode and a negative electrode. However, the greater the height of the positive electrode grid portion, the greater an expansion amount (that is, an elongation amount of a height) when the positive electrode grid portion is degraded by corrosion becomes. Further, when a relatively large element is used, to suppress an overflow phenomenon of an electrolyte solution filling plug, it is necessary to decrease a distance C between an upper end portion of the penetrating connection body and a level of the electrolyte solution (an upper limit level of the electrolyte solution) and hence, frequency that the penetrating connection body is exposed from the electrolyte solution is increased. In view of such circumstances, when the height of the positive electrode grid portion and the negative electrode grid portion becomes 100 mm or more, a corroded region of the negative electrode side member of the penetrating connection body cannot withstand a stress and hence, the penetrating connection body is broken. Accordingly, the cell chambers are short-circuited with each other by the electrolyte solution and hence, a function of the lead-acid battery as a battery is largely impaired.

Therefore, from a viewpoint of suppressing the above-mentioned phenomenon, a distance A between upper end surfaces of the positive electrode shelf and the negative electrode shelf and a lower end portion of the penetration hole is set to 3 mm to 5 mm, and a distance B between an upper end portion of the penetration hole and the upper end portion of the penetrating connection body is set to 3 mm to 5 mm.

From a viewpoint of increasing an output characteristic by shortening a conduction path, it is usually desirable to shorten the distance A as much as possible. Further, the distance B hardly functions as a conduction path and hence, from a viewpoint of reducing a use amount of lead, it is desirable to shorten the distance B as much as possible. However, when the distance A or the distance B becomes less than 3 mm, a close contact region between the penetrating connection body and a periphery of the penetration hole is decreased and hence, sealing property is lowered whereby corrosion of the negative electrode side member of the penetrating connection body is liable to be accelerated.

On the other hand, when the distance A or the distance B exceeds 5 mm, the close contact region between the penetrating connection body and the periphery of the penetration hole is increased by an increased amount and hence, the enhancement of sealing property is expected. However, in an actual operation, when the distance A or the distance B exceeds 5 mm, sealing property is lowered contrary to such expectation. This is because when a height of the penetrating connection body is increased to an extent that the distance A or the distance B exceeds 5 mm, the negative electrode side member of the penetrating connection body is strongly affected by the expansion of the positive electrode grid portion.

To describe this phenomenon in more detail, the greater a height of the penetrating connection body, the greater a distance between a point of force to which expansion of the positive electrode grid portion is applied and a fulcrum of the negative electrode side member on which an expansion stress of the positive electrode grid portion is concentrated becomes. As the distance between the point of force and the fulcrum is increased, a large force acts on the fulcrum even when a force acting on the point of force of the negative electrode side member is small. Accordingly, the negative electrode side member is easily deformed and hence, an electrolyte solution easily enters between the negative electrode side member and the partition wall. As a result, corrosion of the negative electrode side member is accelerated and the penetrating connection body is broken. The corrosion of the negative electrode side member progresses from an outer edge thereof along with the expansion of lead. Accordingly, it is considered that the expansion of the negative electrode side member per se also accelerates corrosion of the negative electrode side member.

On the other hand, by setting the distance A and the distance B to 3 mm to 5 mm respectively, the deformation of the negative electrode side member of the penetrating connection body is suppressed, and corrosion of the negative electrode side member is also suppressed. Accordingly, even when a height of the positive electrode grid portion and the negative electrode grid portion becomes 100 mm or more, the negative electrode side member is minimally affected by a stress generated due to expansion of the positive electrode grid portion.

From a viewpoint of suppressing the exposure of the penetrating connection body from the electrolyte solution, a distance C between the upper end portion of the penetrating connection body and a level of the electrolyte solution (an upper limit level of the electrolyte solution) is set to 0 mm or more. An upper limit of the distance C is decided from a viewpoint of suppressing an overflow phenomenon of an electrolyte solution filling plug mounted on the cell chamber. It is preferable to set the distance C to 0 mm to 15 mm. To suppress an overflow phenomenon while suppressing the exposure of the penetrating connection body from an electrolyte solution as much as possible, it is desirable to control the distance C to 1 mm to 10 mm.

Next, one example of a lead-acid battery according to an embodiment of the present invention is described in more detail with reference to drawings.

Figure 2:
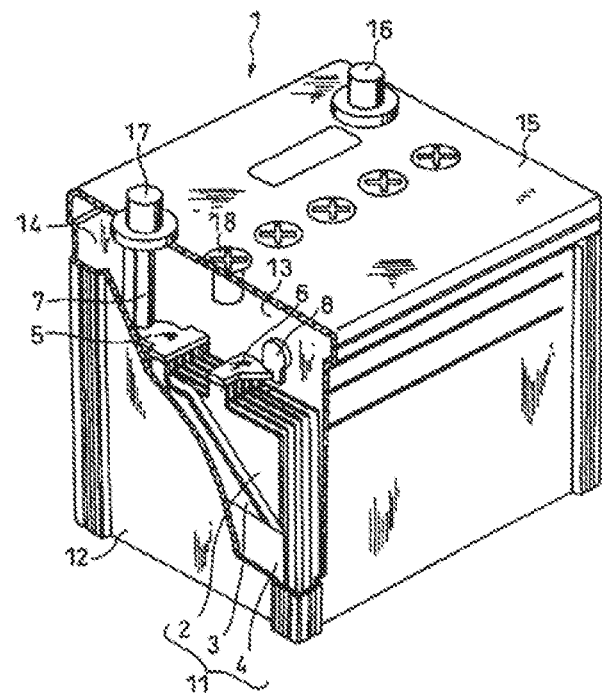
FIG. 2 is a perspective view of the lead-acid battery according to the embodiment of the present invention with a part cut away.
Figure 3:
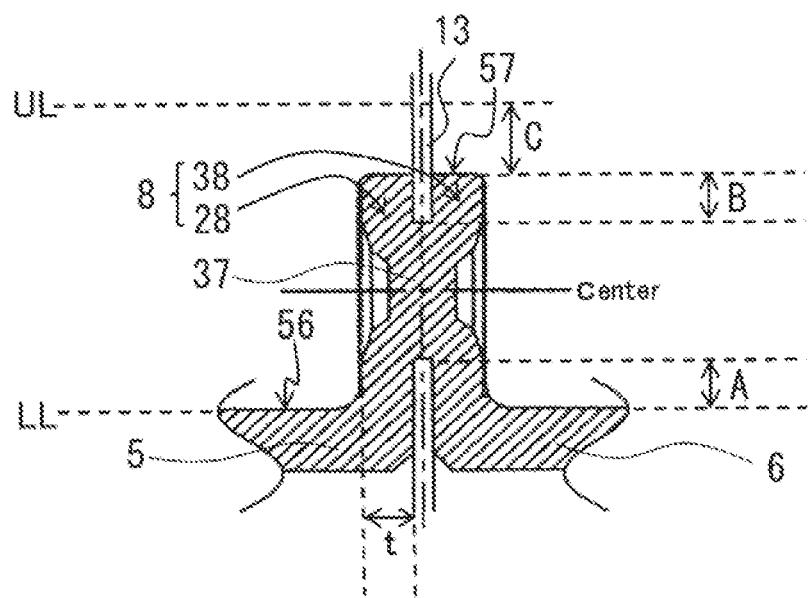
FIG. 3 is a cross-sectional view of a penetrating connection body according to the embodiment of the present invention in cross section perpendicular to a partition wall and a level of an electrolyte solution, and also is an explanatory view showing sizes of a penetration hole formed in the partition wall and the penetrating connection body, and a distance between the level of the electrolyte solution and the penetrating connection body.

FIG. 1 is a front view of the lead-acid battery according to the embodiment of the present invention with a part cut away. FIG. 2 is a perspective view of the lead-acid battery according to the embodiment of the present invention with a part cut away. FIG. 3 is a cross-sectional view of a penetrating connection body according to the embodiment of the present invention in cross section perpendicular to a partition wall and a level of an electrolyte solution.

The lead-acid battery 1 includes elements 11, and an electrolyte solution not shown in the drawing, and the elements 11 and the electrolyte solution are accommodated in a container 12. The container 12 is partitioned into a plurality of cell chambers 14 by partition walls 13, one element 11 is accommodated in each cell chamber 14, and the electrolyte solution is also accommodated in each cell chamber 14. On the container 12, marks which indicate an upper limit level UL and a lower limit level LL of the electrolyte solution are formed respectively. A lid 15 on which a positive electrode terminal 16 and a negative electrode terminal 17 are mounted is mounted on an opening portion of the container 12. Electrolyte solution filling plugs 18 are mounted on the lid 15 corresponding to the respective cell chambers. The electrolyte solution filling plug 18 functions also as a vent plug for releasing a gas generated in the cell chamber 14 to the outside of the battery.

The element 11 is formed by stacking a plurality of positive electrodes 2 and a plurality of negative electrodes 3 with a separator 4 interposed between the positive electrode 2 and the negative electrode 3. In the cell chamber 14 positioned on one end portion of the container 12, a positive electrode shelf 5 which connects lug portions 22 of the plurality of positive electrodes 2 disposed parallel to each other is connected to a positive electrode side member 28 of a penetrating connection body 8. On the other hand, to a negative electrode shelf 6 which connects lug portions 32 of the plurality of negative electrodes 3 parallel to each other, a negative pole 7 is connected. The negative pole 7 is connected to the negative electrode terminal 17 disposed outside the lid 15. In the cell chamber 14 positioned on the other end portion of the container 12, a positive pole (not shown in the drawing) is connected to the positive electrode shelf 5, and a negative electrode side member 38 of the penetrating connection body 8 is connected to the negative electrode shelf 6. The positive pole is connected to the positive electrode terminal 16 disposed outside the lid 15. The positive electrode side member 28 and the negative electrode side member 38 are connected to each other by resistance welding through a penetration hole formed in the partition wall 13 thus forming a welded portion 37 filled in the penetration hole. With such a configuration, the elements 11 of the cell chambers 14 disposed adjacently to each other are connected in series. On the periphery of the penetration hole, the positive electrode side member 28 and the negative electrode side member 38 are brought into close contact with each other and hence, in a usual state, short-circuiting between the cell chambers 14 due to an electrolyte solution is suppressed. In each cell chamber 14, an upper end portion 57 of the penetrating connection body 8 is designed to be positioned equal to or below the upper limit level UL of a level of the electrolyte solution. Further, upper end surface 56 of the positive electrode shelf 5 and upper end surface of the negative electrode shelf 6 are designed such that the upper end surfaces 56 are positioned equal to or below the lower limit level LL of the electrolyte solution.

A distance A between the upper end surfaces 56 of the positive electrode shelf 5 and the negative electrode shelf 6 and a lower end portion of the penetration hole is set to 3 mm to 5 mm. Further, a distance B between an upper end portion of the penetration hole and the upper end portion 57 of the penetrating connection body 8 is set to 3 mm to 5 mm. Usually, from a viewpoint of ensuring sufficient welding strength and ensuring sufficient sealing property, a distance between the lower end portion and the upper end portion of the penetration hole is set to 8 mm to 14 mm. A minimum thickness of the welded portion 37 filled in the penetration hole is preferably set to 3.5 mm to 6.5 mm, and it is preferable that the thickness of the partition wall 13 be set corresponding to the minimum thickness. Thicknesses t of the positive electrode side member 28 and the negative electrode side member 38 are set to 3 mm to 6 mm from a viewpoint of decreasing a use amount of lead as much as possible while ensuring sufficient strength of the respective members. The welded portion 37 is formed of a pair of welding terminals each having a convex portion with a flat top portion, and is formed by clamping and pressurizing portions of the positive electrode side member 28 and the negative electrode side member 38 in an area in the vicinity of the center of the positive electrode side member 28 and the negative electrode side member 38 simultaneously. Accordingly, a flat portion is formed in the area of the welded portion 37 in the vicinity of the center of the welded portion 37. A minimum thickness of the welded portion 37 is a thickness measured at least at the area in the vicinity of the center of the flat portion.

It is preferable that a lead alloy which is used for forming the penetrating connection body 8 contain antimony (Sb) and tin (Sn). The content of antimony in the lead alloy is 1.5 to 4 mass %, for example. The content of tin in the lead alloy is 1 to 6 mass %, for example.

(Positive Electrode)

Figure 4:
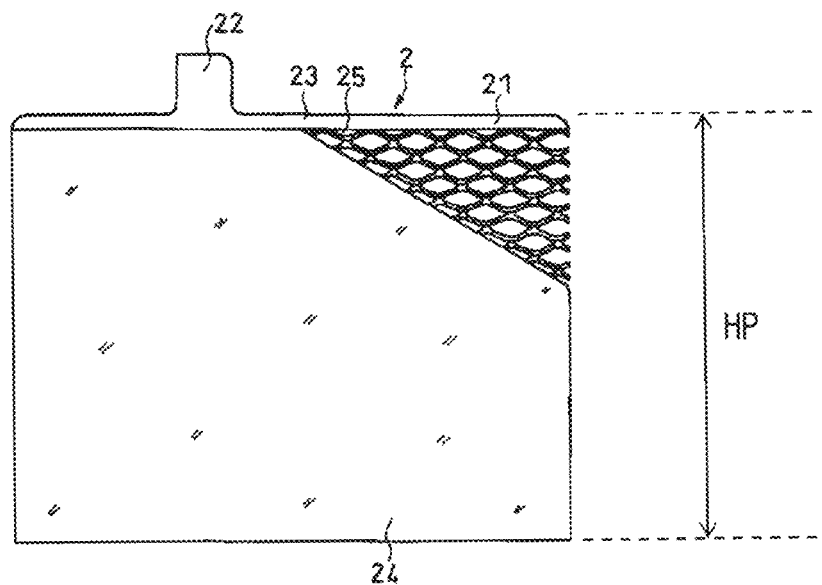
FIG. 4 is a front view of a positive electrode of the lead-acid battery shown in FIG. 2.

FIG. 4 is a front view of the positive electrode 2. The positive electrode 2 includes a positive electrode grid portion 21 having a height HP, and a positive composite 24 carried by the positive electrode grid portion 21. The positive electrode grid portion 21 is an expanded grid which includes an expanded mesh 25 holding a positive composite 24, and a frame 23 which is attached to an upper end portion of the expanded mesh 25. The positive electrode lug portion 22 is continuously formed with the frame 23. The positive electrode grid portions 21 are connected to the positive electrode shelf 5 by way of the positive electrode lug portions 22, and the positive electrode shelf 5 is connected to the positive electrode side member 28 of the penetrating connection body 8 or the positive pole.

The positive electrode grid portion 21 and the positive electrode lug portion 22 can be formed by expanding a lead alloy sheet. A method for forming the positive electrode grid portion 21 and the positive electrode lug portion 22 is not particularly limited. A rotary-type expanding method may be adopted, or a reciprocal expanding method may be also adopted. It is preferable that a lead alloy which is used for forming the positive electrode grid portion 21 contain antimony (Sb), and it is more preferable that the lead alloy contain calcium (Ca) and tin (Sn) in addition to antimony (Sb). The content of calcium in the lead alloy is 0.01 to 0.1 mass %, for example. The content of tin in the lead alloy is 0.05 to 3 mass %, for example.

As a positive active material, lead oxide ($PbO_2$) is used. The positive composite may contain a known additive when necessary besides a positive active material.

(Negative Electrode)

Figure 5:
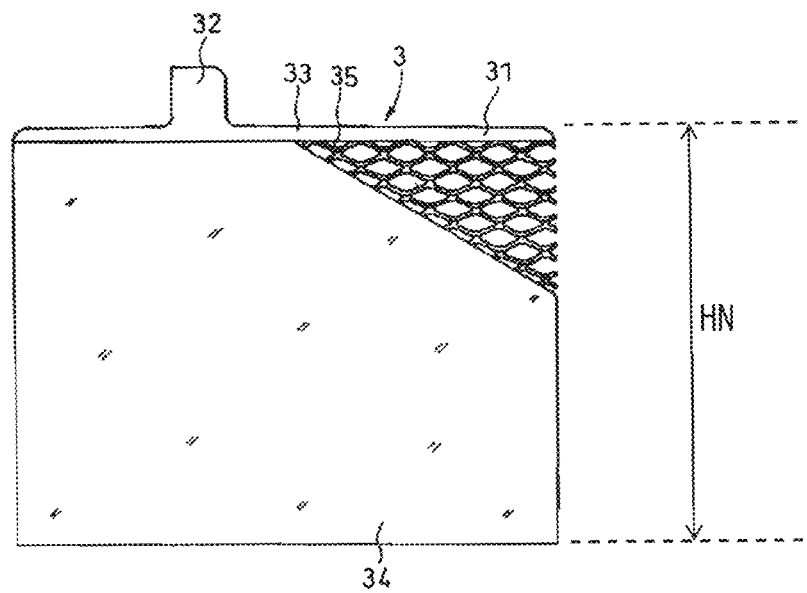
FIG. 5 is a front view of a negative electrode of the lead-acid battery shown in FIG. 2.

FIG. 5 is a front view of the negative electrode 3. The negative electrode 3 includes a negative electrode grid portion 31 having a height HN, and a negative composite 34 which is carried by the negative electrode grid portion 31. Usually, the height HN and the height HP are designed so as to take substantially the same value. The negative electrode grid portion 31 is an expanded grid including an expanded mesh 35, and a frame 33 attached to an upper end portion of the expanded mesh 35. The negative electrode lug portion 32 is continuously formed with the frame 33. The negative electrode grid portions 31 are connected to the negative electrode shelf 6 by way of the negative electrode lug portions 32, and the negative electrode shelf 6 is connected to the negative pole 7 or the negative electrode side member 38 of the penetrating connection body 8. The negative composite 34 is carried by the expanded mesh 35.

The negative electrode grid portion 31 and the negative electrode lug portion 32 can be also formed by expanding a lead alloy sheet. It is preferable that a lead alloy which is used for forming the negative electrode grid portion 31 contain calcium (Ca) and tin (Sn). The content of calcium in the lead alloy is 0.01 to 0.1 mass %, for example. The content of tin in the lead alloy is 0.1 to 2.0 mass %, for example. Further, it is preferable that bismuth be contained in a surface layer portion of the negative electrode lug portion 32.

As the negative active material, lead is used. Lead may contain a very small amount of alloy component. In this case, it is preferable that the negative composite contain 0.3 or more parts by mass of carbon black with respect to 100 parts by mass of lead. On the other hand, it is preferable that the content of carbon black be set to 1 part by mass or below with respect to 100 parts by mass of lead.

The positive electrode and the negative electrode are formed such that a mixture containing lead oxide, lead powder, and a sulfuric acid aqueous solution is coated to a positive electrode grid portion and a negative electrode grid portion and, thereafter, these positive electrode grid portion and the negative electrode grid portion are chemically treated (charged) in the container of the lead-acid battery.

(Separator)

As the separator, a microporous film, a fiber sheet (or mat) or the like can be exemplified. As a polymer material which is used for forming the microporous film or the fiber sheet, polyolefin such as polyethylene or polypropylene having acid resistance can be exemplified. The fiber sheet may be formed using inorganic fiber such as polymer fiber and/or glass fiber. The separator may contain an additive such as a filler and/or carbon when necessary.

(Electrolyte Solution)

The electrolyte solution contains sulfuric acid aqueous solution. Density of the electrolyte solution is 1.1 to 1.35 g/cm$^3$, for example. Density of the electrolyte solution is preferably set to 1.2 to 1.35 g/cm$^3$, and is more preferably set to 1.25 to 1.3 g/cm$^3$. In this specification, density of the electrolyte solution is density at a temperature of 20° C., and it is desirable that density of the electrolyte solution of a battery in a full charged state fall within the above-mentioned range.

Hereinafter, the present invention is described in detail with reference to examples and comparison examples. The present invention is not limited to the examples described hereinafter.

Example 1

(1) Manufacture of Positive Electrode

The positive electrode 2 shown in FIG. 4 was manufactured in accordance with the following steps.

A paste containing a positive composite was obtained by mixing raw material powder (mixture of lead and lead oxide), water, and a diluted sulfuric acid together. A plate member was manufactured by performing continuous slab casting and multi-stage rolling of a Pb—Ca—Sn alloy and, thereafter, the plate member was expanded thus manufacturing the positive electrode grid portion 21 integrally formed with the positive electrode lug portion 22.

By filling the paste containing a positive composite in the expanded mesh 25 of the positive electrode grid portion and by aging and drying the paste, unformed positive electrode 2 was obtained where the positive composite 24 was held by the positive electrode grid portion 21 (the grid portion having a height of 100 mm and a lateral width of 137.5 mm).

(2) Manufacture of Negative Electrode

The negative electrode 3 shown in FIG. 5 was manufactured in accordance with the following steps.

A paste containing a negative composite was obtained by mixing raw material powder (mixture of lead and lead oxide), water, a diluted sulfuric acid, lignin, barium sulfate, and carbon black together. A plate member was manufactured using a Pb—Ca—Sn alloy by the same method used for manufacturing the positive electrode grid portion and, thereafter, the plate member was expanded thus manufacturing the negative electrode grid portion 31 integrally formed with the negative electrode lug portion 32.

By filling the paste containing the negative composite to the expanded mesh of the negative electrode grid portion 31 and by aging and drying the paste, unformed negative electrode 3 was obtained where the negative composite 34 was carried by the negative electrode grid portion 31 (the grid portion having a height of 100 mm and a lateral width of 137.5 mm).

(3) Manufacture of Lead-Acid Battery

The lead-acid battery 1 shown in FIG. 1 and FIG. 2 was manufactured in accordance with the following steps.

Each negative electrode 3 was accommodated in polyethylene-made bag-shaped separator 4 and, then, eight positive electrodes 2 and nine negative electrodes 3 were disposed such that the positive electrode 2 and the negative electrode 3 are alternately stacked to each other. Next, positive electrode shelf 5 was welded to a bundle of the positive electrode lug portions 22, and the negative electrode shelf 6 was welded to a bundle of the negative electrode lug portions 32 thus forming the element 11. At this stage of operation, a height of an upper end surface of the positive electrode shelf 5 and a height of an upper end surface of the negative electrode shelf 6 were set equal to each other. In such welding, the positive electrode side member 28 which becomes the predetermined penetrating connection body 8 was continuously formed with the positive electrode shelf 5, and the negative electrode side member 38 which becomes the predetermined penetrating connection body 8 was continuously formed on the negative electrode shelf 6.

Next, the element 11 was accommodated in each of six cell chambers 14 of the container 12 partitioned by the partition walls 13 on a one-by-one basis. Then, to connect the elements 11 disposed adjacently to each other in series, the positive electrode side member 28 continuously formed with the positive electrode shelf 5 and having a thickness t of 4 mm (see FIG. 3) and the negative electrode side member 38 continuously formed with the negative electrode shelf 6 of the neighboring element 11 and having a thickness t of 4 mm (see FIG. 3) were connected to each other by resistance welding through the penetration hole formed in the partition wall 13 having a thickness of 1.4 mm. A distance (diameter 4) between a lower end portion and an upper end portion of the penetration hole was set to 11 mm. At this stage of operation, the distance A between the upper end surfaces 56 of the positive electrode shelf 5 and the negative electrode shelf 6 and the lower end portion of the penetration hole was set to 3 mm, the distance B between the upper end portion of the penetration hole and the upper end portion 57 of the penetrating connection body 8 was set to 3 mm, and a minimum thickness of the welded portion 37 is set to 5 mm.

Next, the lid 15 was mounted on the opening portion of the container 12, and the positive electrode terminal 16 and the negative electrode terminal 17 mounted on the lid 15 were welded to the positive pole and the negative pole respectively. Then, the electrolyte solution was filled in the container 12 from electrolyte solution filling ports formed in the lid 15 until the electrolyte solution reached the upper end portions of the penetrating connection bodies 8, and chemical conversion was performed in the container. Thereafter, density of the electrolyte solution was adjusted to 1.28 $g/cm^3$, and the electrolyte solution filling ports were closed by the electrolyte solution filling plugs (vent plugs) so that a lead-acid battery (A1) of 95D26 (12V-63 Ah) prescribed in JIS D5301 was manufactured. At this stage of operation, the distance C between the upper end portion 57 of the penetrating connection body 8 and a level of the electrolyte solution was set to 0 mm.

Examples 2 to 8 and Comparison Examples 1 to 11

Lead-acid batteries were manufactured substantially similar to the example 1 except that the distance A, the distance B, the distance C, and the heights (HP=HN=H) of the positive electrode grid portion and the negative electrode grid portion were changed as shown in Table 1. Batteries of examples 2 to 8 were respectively referred to as batteries A2 to A8, and batteries of the comparison examples 1 to 11 were respectively referred to as batteries B1 to B11.

[Evaluation 1]
<Resistance Welding Corrosion Test>

A light-load life test defined by JIS D5301 was performed with respect to the above-mentioned batteries A1 to A8 and the batteries B1 to B11. In the light-load life test, for the sake of convenience, a test atmosphere was changed from a 40° C. liquid phase to a 75° C. gas phase, and a discharge time at a discharge current of 25 A in a charge-discharge cycle was changed from 4 minutes to 1 minute. That is, a step where the battery was discharged for 1 minute at a discharge current of 25 A under a 75° C. environment and, then, the battery was charged for 10 minutes at a charge voltage of 13.5 V (maximum current 25 A) was repeated (610 cycles per week). Every time that the level of the electrolyte solution reached the upper end surface 56 of the positive and negative electrode shelves (that is, the lower limit level LL), the electrolyte solution was replenished until the electrolyte solution reached the upper limit level UL.

Each time that the above-mentioned step was repeated 610 cycles, the battery was discharged for 2 seconds at a discharge current of 200 A, and the number of cycles at which a voltage after 2 seconds elapsed was lowered to 3.0 V was set as the durable life number. When the durable life number was equal to or less than 4880 cycles, a degradation mode was confirmed in accordance with the following steps.
(1) Confirmation of Density of Electrolyte Solution The above-mentioned cycle in life test is a condition close to a condition under a state where a cell is overcharged and hence, density of the electrolyte solution transcends in a state close to density in a state where the cell is fully charged. In a usual degradation mode, density of the electrolyte solution in each cell chamber takes a value near 1.28 $g/cm^3$ which is a value at a fully-charged state. On the other hand, in a sudden degradation mode where short-circuiting occurs through an electrolyte solution, a cell is excessively discharged and hence, density of the electrolyte solution is decreased compared to density of the electrolyte solution in a usual degradation mode. In view of the above, density of the electrolyte solution in each cell chamber was measured, and a case where density of the electrolyte solution was excessively small was determined as a candidate of a sudden degradation mode.
(2) Confirmation of Sealing Property Between Penetrating Connection Body and Partition Wall Next, a battery in a candidate of a sudden degradation mode was disassembled, and states of the elements and the penetrating connection bodies were observed. In this observation, when the penetrating connection body easily tilted relative to the partition wall so that the sealing property between the negative electrode side member and the partition wall was impaired, it was determined that the battery was in a sudden degradation mode. Modes other than a sudden degradation mode were determined as a usual degradation mode.

TABLE 1

| Battery | Distance A (mm) | Distance B (mm) | Distance C (mm) | Grid portion height H (mm) | Durable life number | Capacity | Degradation mode | Comprehensive evaluation |
|---|---|---|---|---|---|---|---|---|
| B1 | 2 | 3 | 0 | 100 | 4270 | good | sudden | bad |
| B2 | 3 | 2 | 0 | 100 | 4270 | good | sudden | bad |
| A1 | 3 | 3 | 0 | 100 | 7320 | good | usual | good |
| B3 | 2 | 3 | 0 | 98 | 6710 | bad | usual | fair |
| B4 | 3 | 2 | 0 | 98 | 6710 | bad | usual | fair |

TABLE 1-continued

| Battery | Distance A (mm) | Distance B (mm) | Distance C (mm) | Grid portion height H (mm) | Durable life number | Capacity | Degradation mode | Comprehensive evaluation |
|---|---|---|---|---|---|---|---|---|
| B5 | 3 | 3 | 0 | 98 | 6710 | bad | usual | fair |
| B6 | 3 | 3 | −1 | 98 | 4270 | bad | sudden | bad |
| A2 | 5 | 5 | 0 | 100 | 7320 | good | usual | good |
| B7 | 6 | 5 | 0 | 100 | 4270 | good | sudden | bad |
| B8 | 5 | 6 | 0 | 100 | 4270 | good | sudden | bad |
| B9 | 6 | 6 | 0 | 100 | 3660 | good | sudden | bad |
| B10 | 4 | 4 | −1 | 100 | 4270 | good | sudden | bad |
| A3 | 4 | 4 | 0 | 103 | 7930 | good | usual | good |
| A4 | 4 | 4 | 0 | 105 | 8540 | good | usual | good |
| A5 | 4 | 4 | 0 | 113 | 9760 | good | usual | good |
| B11 | 4 | 4 | −10 | 100 | 3050 | good | sudden | bad |
| A6 | 4 | 4 | 10 | 100 | 7930 | good | usual | good |
| A7 | 4 | 4 | 1 | 100 | 7930 | good | usual | good |
| A8 | 4 | 4 | 5 | 100 | 7930 | good | usual | good |

In the batteries B3 to B5, a height of the grid portion of the electrode was less than 100 mm and hence, even when the distance A or the distance B was less than 3 mm, a sudden degradation mode of the penetrating connection body was not observed at all. In the batteries B3 to B5, short circuiting between the cell chambers through an electrolyte solution did not occur. This is because the negative electrode side member of the penetrating connection body was minimally affected by an expansion of the positive electrode grid portion.

On the other hand, in the batteries B6, B10, B11, irrelevant to a height H of grid portions of electrodes and distances A, B, a sudden degradation mode of the penetrating connection body occurred. It is considered that when the distance C was less than 0, the penetrating connection portion was partially exposed from the electrolyte solution constantly and hence, corrosion of the negative electrode side member was accelerated conspicuously.

Next, in the batteries B1, B2, although either the distance A or the distance B was less than 3 mm similar to the batteries B3 to B5, the height H of the electrode grid portion was large, that is, 100 mm. Accordingly, sufficient sealing property could not be ensured so that a sudden degradation mode of the penetrating connection body occurred.

In the batteries B7, B8, and B9, the height H of the electrode grid portion was large, that is, 100 mm, and the distance A or the distance B exceeded 5 mm and hence, a sudden degradation mode of the penetrating connection body occurred. It is understood that a sudden degradation mode occurred in such a manner that sealing property between the negative electrode side member and the partition wall was impaired with a stress generated by expansion of the positive electrode grid portion as an initiation point and corrosion of the negative electrode side member of the penetrating connection body was accelerated. Since corrosion of the negative electrode side member progresses from an outer edge along with expansion of lead, at a glance, it may be considered that the larger the distance A, B, the more minimally the short-circuiting through an electrolyte solution occurs. However, in an actual operation, it is considered that the larger the distance A, B, the more strongly the principle of leverage acts and hence, the deformation of the negative electrode side member is accelerated due to expansion of the positive electrode grid portion whereby sealing property between the negative electrode side member and the partition wall is impaired and corrosion of the negative electrode side member is accelerated.

From the comparison of the batteries B1 to B11 and A1 to A8 described heretofore, it is understood that when the height H of the grid portion of the electrode was 100 mm or more, a control of the distance A, the distance B, and the distance C was extremely important in suppressing sudden degradation. The larger the sum of the distance A, the distance B, and the distance C, the smaller frequency of times of replenishing water becomes.

INDUSTRIAL APPLICABILITY

The lead-acid battery according to the present invention is suitably used in an application where the battery is required to possess high capacity and is used under a severe condition that degradation of positive electrode and negative electrode is liable to be accelerated.

The present invention has been described with respect to the presently preferred embodiments. However, the disclosure of the present invention should not be construed in a limitative manner. Various modifications and changes of the present invention will definitely become apparent to those skilled in the art to which the present invention pertains upon reading the above disclosure. Accordingly, it should be construed that the appended Claims embrace all variations and modifications which do not depart from the true spirit and scope of the present invention.

DESCRIPTION OF REFERENCE SIGNS

1: lead-acid battery
2: positive electrode
3: negative electrode
4: separator
5: positive electrode shelf
6: negative electrode shelf
7: negative pole
8: penetrating connection body
11: element
12: container
13: partition wall
14: cell chamber
15: lid
16: positive electrode terminal
17: negative electrode terminal
18: electrolyte solution filling plug
21: positive electrode grid portion
22: positive electrode lug portion 23: frame of positive electrode grid portion
24: positive composite
25: expanded mesh of positive electrode grid
28: positive electrode side member
31: negative electrode grid portion
32: negative electrode lug portion
33: frame of negative electrode grid portion
34: negative composite
35: expanded mesh of negative electrode grid
37: welded portion
38: negative electrode side member
56: upper end surface of positive and negative electrode shelf
57: upper end portion of penetrating connection body

The invention claimed is:

1. A lead-acid battery comprising:
a container;
a partition wall which forms a plurality of cell chambers by partitioning the container;
a plurality of elements each of which is accommodated in each of the plurality of cell chambers;
an electrolyte solution accommodated in the plurality of cell chambers respectively; and
a lid which closes opening portions of the plurality of cell chambers,
wherein
each of the elements includes a plurality of positive electrodes, a positive electrode shelf which connects the plurality of positive electrodes parallel to each other, a plurality of negative electrodes, a negative electrode shelf which connects the plurality of negative electrodes parallel to each other, and a separator which is interposed between the positive electrode and the negative electrode disposed adjacently to each other,
the plurality of positive electrodes include a positive active material, a positive electrode grid portion which carries the positive active material, and a positive electrode lug portion which is integrally formed with the positive electrode grid portion for connecting the positive electrode to the positive electrode shelf,
the plurality of negative electrodes include a negative active material, a negative electrode grid portion which carries the negative active material, and a negative electrode lug portion which is integrally formed with the negative electrode grid portion for connecting the negative electrode to the negative electrode shelf,
the positive electrode shelf of one of two said elements accommodated in the respective cell chambers disposed adjacently to each other and the negative electrode shelf of the other element are electrically connected to each other through a penetrating connection body penetrating the partition wall,
the penetrating connection body includes a positive electrode side member continuously formed with the positive electrode shelf and a negative electrode side member continuously formed with the negative electrode shelf, and the positive electrode side member and the negative electrode side member form a welded portion filled in a penetration hole formed in the partition wall and are brought into close contact with a periphery of the penetration hole,
a distance A between upper end surfaces of the positive electrode shelf and the negative electrode shelf and a lower end portion of the penetration hole is set to 3 mm to 5 mm,
a distance B between an upper end portion of the penetration hole and an upper end portion of the penetrating connection body is set to 3 mm to 5 mm,
a distance C between the upper end portion of the penetrating connection body and a level of the electrolyte solution is set to 0 mm to 15 mm, and
a height of the positive electrode grid portion and the negative electrode grid portion is set to 100 mm to 113 mm.

2. The lead-acid battery according to claim 1, wherein a thickness of the partition wall around the penetration hole is set to less than 1.7 mm.

* * * * *